(12) United States Patent
Kim et al.

(10) Patent No.: US 6,392,781 B1
(45) Date of Patent: May 21, 2002

(54) HIGH SPEED SEMICONDUCTOR OPTICAL MODULATOR AND FABRICATING METHOD THEREOF

(75) Inventors: Je Ha Kim; Chan Yong Park; Kwang Eui Pyun, all of Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/498,610

(22) Filed: Feb. 4, 2000

(30) Foreign Application Priority Data

Sep. 15, 1999 (KR) ............................................. 99-39599

(51) Int. Cl.⁷ ................................................. G02F 1/03
(52) U.S. Cl. ..................... 359/248; 359/254; 359/260; 359/276; 385/1; 385/2; 385/3; 385/131; 257/14; 257/96; 257/98
(58) Field of Search ................................. 359/245, 246, 359/247, 248, 254, 260, 276; 257/14, 80, 94, 96, 98, 101, 458; 385/1, 2, 3, 8, 131

(56) References Cited

U.S. PATENT DOCUMENTS

| | | | | |
|---|---|---|---|---|
| 5,307,200 | A | * 4/1994 | Yoshida | 359/248 |
| 5,742,423 | A | 4/1998 | Ido et al. | 359/254 |
| 5,914,496 | A | * 6/1999 | Thijs et al. | 257/14 |
| 5,953,149 | A | * 9/1999 | Ishizaka | 359/248 |
| 6,207,973 | B1 | * 3/2001 | Sato et al. | 257/98 |

OTHER PUBLICATIONS

Ido, T. et al., "MQW Electroabsorption Optical Modulator for Gbit/s Modulation, " *Electronics Letters*31(24):2124–2125, Nov. 23, 1995.
Weinmann, R. et al., "Polarization–Independent and Ultra–High Bandwidth Electroabsorption Modulator in Multiquantum–Well Deep–Ridge Waveguide Technolgy, " *IEEE Photonics Technology Letters*8(7):891–893, Jul. 1996.

* cited by examiner

*Primary Examiner*—Loha Ben
(74) *Attorney, Agent, or Firm*—Seed IP Law Group PLLC

(57) ABSTRACT

The present invention relates to an electrical field absorbing semiconductor optical modulator, more particularly, to a high speed semiconductor optical modulator and a fabricating method thereof. The present invention includes a high speed semiconductor optical modulator, the optical modulator formed by stacking an n-type light-wave guiding layer, a light absorbing layer, a p-type light-wave guiding layer, a p-type clad layer, and a p-type ohmic contact layer on a substrate successively, the optical modulator having a ridge structure wherein the optical modulator is an electric-field absorbing type, and wherein width W3 of the light absorbing layer is less than the width W1 of the p-type ohmic contact layer. Accordingly, the present invention enables to provide high speed optical modulation of tens of giga rate of which modulating characteristics are excellent by reducing contact resistance and capacitance, which are the major problems of ruining the characteristics of an optical modulator, simultaneously.

10 Claims, 4 Drawing Sheets

HIGH SPEED SEMICONDUCTOR OPTICAL MODULATOR AND FABRICATING METHOD THEREOF

TECHNICAL FIELD

The present invention relates to an electrical field absorbing semiconductor optical modulator, more particularly, to a high speed semiconductor optical modulator and a fabricating method thereof.

BACKGROUND OF THE INVENTION

A semiconductor laser is mainly used as a light source of optical communication. Once current is applied to a semiconductor laser, a monochromatic light is irradiated. Optical signals are transmitted by modulating intensity of the monochromatic light and by having the modulated light pass through an optical fiber. Conventionally, a method of modulating the current applied to a semiconductor laser is used to modulate the intensity of a light emitted from a semiconductor laser However, such method generates "Chirping", which is "displacement of a light wave", thereby causing troubles in sending a long-distant high speed signal over 2,5 Gb/s.

As a solution of the above trouble, proposed is a technique of outputting a semiconductor laser light having a predetermined intensity and modulating intensity of a light by using another optical device outside. The optical device playing such a role is called an optical modulator which includes an electric-field absorbing type optical modulator, etc.

The optical modulator of an electric-field absorbing type use the phenomenon that a band gab is shrunk provided that an electric field is applied to a semiconductor laser. Namely, a light passes through the optical modulator when an electric field is applied to the semiconductor laser. On the other hand, the optical device blocks the light by absorbing once the electric field is applied to. Thus, the optical device produces an optical signal by modulating a certain intensity of the light transmitted from a light source.

The optical modulator of the electric-field absorbing type is manufactured to have a figure of a wave-guiding passage by using a semiconductor of a direct transition having a band gap amounting to a light wave emitted from a semiconductor laser or by using a multi-quantum well(MQW).

FIG. 1 shows a cross-sectional structure of an optical modulator of an electric-field absorbing type according to a related art.

Referring to FIG. 1, after a first conductive type InGaAsP layer 12, an MQW absorbing layer 13, a second conductive type InGaAsP layer 14, a second conductive type InP layer 15, and a second conductive type ohmic contact layer 16 have been formed on a substrate 11 successively, all layers except a belt pattern are etched to expose a surface of the substrate 11.

Then, polyimide 17 is formed around the belt pattern on the substrate 11. And, metal electrodes 19 and 20 are formed on a top of the belt pattern and beneath the substrate 20.

As a refractive index of the MQW absorbing layer 13 is higher than that of the surroundings, an incident light into the MQW layer 13 progresses along with the wave-guiding passage of the belt pattern, thereby being absorbed continuously or transmitted to the reverse direction of incidence.

Once a bias voltage is applied to a p-type electrode 19 and an n-type electrode 20 which are formed on the top of and under the optical modulator respectively, that is, voltage of the n-type electrode 20 is higher than that of the p-type electrode 19, carriers are generated from the MQW absorbing layer 13. Thus, electrons proceed to the n-type electrode 20, while holes move to the p-type electrode 20.

On the other hand, the light transmits through the MQW absorbing layer 13 as there occurs no absorption of light without applied voltage thereto.

Such optical modulator of an electric-field absorbing type modulates the intensity of light by changing the voltage applied to the p-type and n-type electrodes 19 and 20.

Important parameters of the optical modulator are modulation speed and extinction ratio. And, variables deciding the modulation speed are capacitance, resistance, charge transportation, and the like which are related to the structure of the optical modulator.

In order to reduce capacitance, the MQW absorbing layer is formed thin and/or the area of the MQW layer should be small. Thus, the area of the absorbing layer should be reduced because high speed optical modulation of tens of giga needs capacitance under 0.1 pF. Therefore, width of the absorbing layer is limited under 2 $\mu$m.

Capacitance may be decreased provided that the MQW absorbing layer is formed thick. But, this technique cancels out the effect of decreasing capacitance since high speed operation is inhibited by increased operating voltage and slow transportation speed.

Unfortunately, contact resistance between the electrode and the MQW absorbing layer increases due to the narrow width of the MQW absorbing layer in the optical modulator according to the related art. The increased contact resistance slows down the speed of optical modulation. That is why a new structure reducing both capacitance and contact resistance is required for the fabrication of a high speed optical modulator.

SUMMARY OF THE INVENTION

Accordingly, the present invention is directed to a high speed semiconductor optical modulator and a fabricating method thereof that substantially obviate one or more of the problems due to limitations and disadvantages of the related art.

The object of the present invention is to provide a high speed semiconductor optical modulator and a fabricating method thereof which form a narrow width of a light absorbing layer and a wide electrode contact area simultaneously in order to reduce both capacitance and contact resistance hindering the high speed operation of a device.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes a high speed semiconductor optical modulator, the optical modulator formed by stacking an n-type light-wave guiding layer, a light absorbing layer, a p-type light-wave guiding layer, a p-type clad layer, and a p-type ohmic contact layer on a substrate successively, the optical modulator having a ridge structure wherein the optical modulator is an electric-field absorbing type, and wherein width W3 of the light absorbing layer is less than the width W1 of the p-type ohmic contact layer.

Preferably, widths of the n-type light-wave guiding layer, p-type light-wave guiding layer, and p-type clad layer are identical one another and wherein the width W2 is longer than or equal to the width W1 of the p-type ohmic contact layer. And, the width W3 of the light absorbing layer is 1–3 μm while the width of the p-type ohmic contact layer is 5–10 μm.

In another aspect, the present invention includes the following steps. A first step is of forming a ridge structure by stacking an n-type light-wave guiding layer, a light absorbing layer, a p-type light-wave guiding layer, a p-type clad layer, and a p-type ohmic contact layer on a substrate successively. A second step is of etching the p-type ohmic contact layer to have a width W1. A third step is of etching vertically the n-type light-wave guiding layer, the light absorbing layer, the p-type light-wave guiding layer, the p-type clad layer, and the p-type ohmic contact layer to have widths W2. And a fourth step is of side-etching the light absorbing layer to have a width W3 which is narrower than the width W1.

The present invention further includes the steps of a fifth step of forming a dielectric at a side of the ridge structure, a sixth step of forming a dielectric film on the p-type clad layer while the p-type ohmic contact layer is exposed, and a seventh step of forming a p-type electrode on the p-type ohmic contact layer and an n-type electrode beneath the substrate.

Preferably, the fourth step is carried out during a predetermined time enough to etch completely a test pattern of which width is equal to a difference between the widths W2 and W3.

And, the width W2 is equal to or wider than the width W1 of the p-type ohmic contact layer while the width W3 of the light absorbing layer is 1~3 μm and the width W1 of the p-type ohmic contact layer is 5~10 μm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the inventing and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings.

Figure 1:
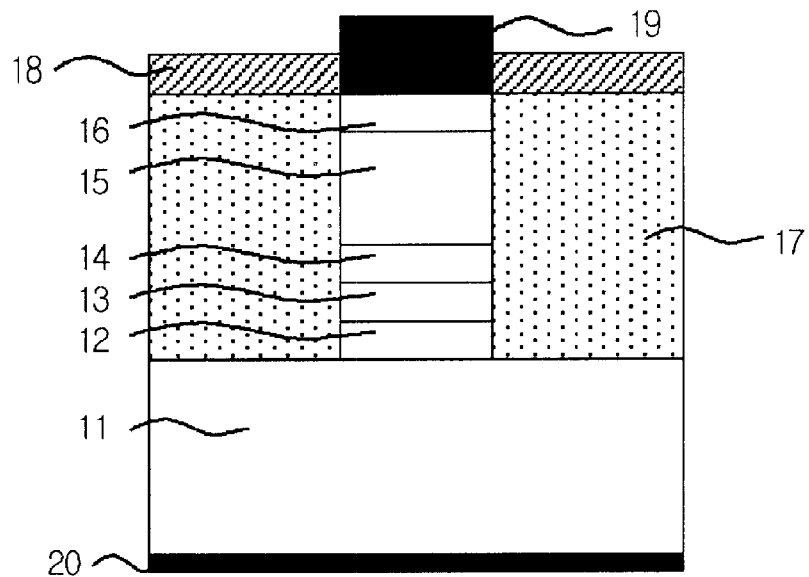
FIG. 1 shows a cross-sectional structure of an electric-field absorbing optical modulator of a ridge type according to a related art.
Figure 2:
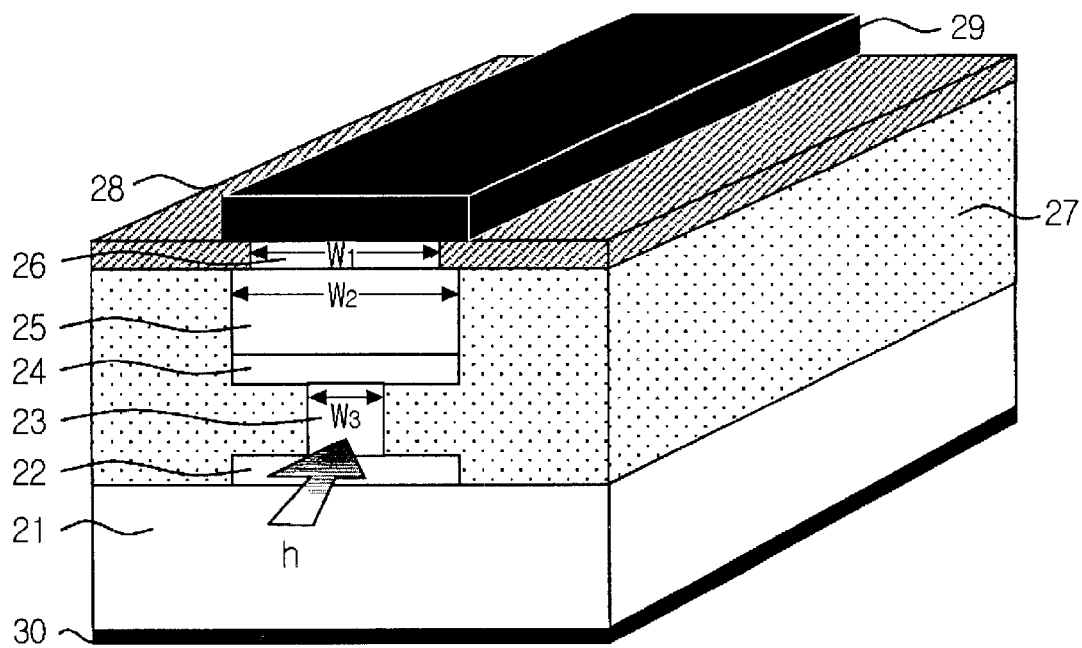
FIG. 2 shows a perspective structure of a high speed semiconductor optical modulator according to an embodiment of the present invention.

FIG. 2 shows a perspective structure of a high speed semiconductor optical modulator according to an embodiment of the present invention.

Referring to FIG. 2, an n-type light-wave guiding layer 22, a light absorbing layer 23, a p-type light-wave guiding layer 24, a p-type clad layer 25, and a p-type ohmic contact layer 26 are formed on a substrate 21, successively.

The ohmic contact layer 26 of which width is W1 is made of InGaAs doped with $p^+$ type. The p-type clad layer 25 of which width is W2 is made of InP doped with p type. The p-type light-wave guiding layer 24 of which width is W2 is made of InGaAsP doped with p type. The light absorbing layer 23 of which width is W3 is made of InGaAsP or MQW(multi-quantum well). And, the n-type light-wave guiding layer 22 of which width is W2 is made of InGaAsP doped with n type. In these cases, "W3<W1≦W2".

FIG. 3A to FIG. 3H show cross-sectional views of fabricating a high speed semiconductor optical modulator according to an embodiment of the present invention.

Figure 3A:
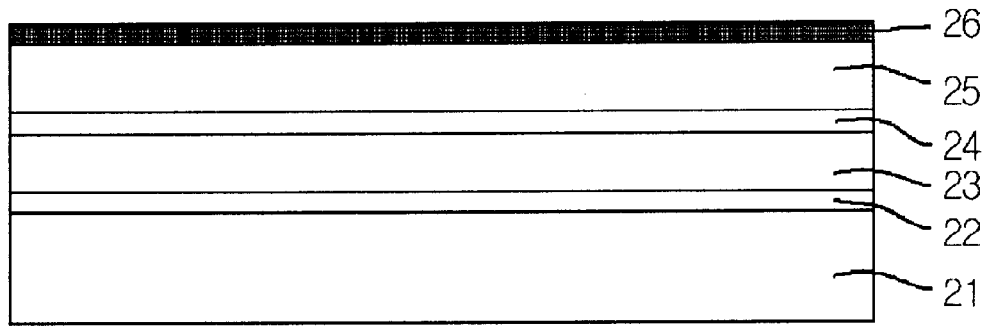
FIG. 3A to FIG. 3H show cross-sectional views of fabricating a high speed semiconductor optical modulator according to an embodiment of the present invention.
Figure 3B:
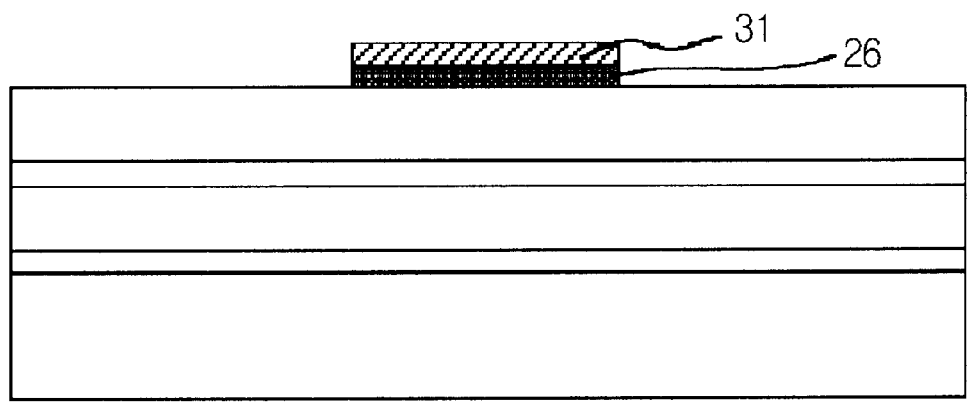

Referring to FIG. 3A, an n-type light-wave guiding layer 22, a light absorbing layer 23, a p-type light-wave guiding layer 24, a p-type clad layer 25, and a p-typed ohmic contact layer 26 are formed on a substrate 21, successively.

After, a dielectric film 31 of a stripe pattern of which width is W1 has been formed on the p-type ohmic contact layer 26, the ohmic contact layer 26 is etched to have a width W1.

Figure 3C:
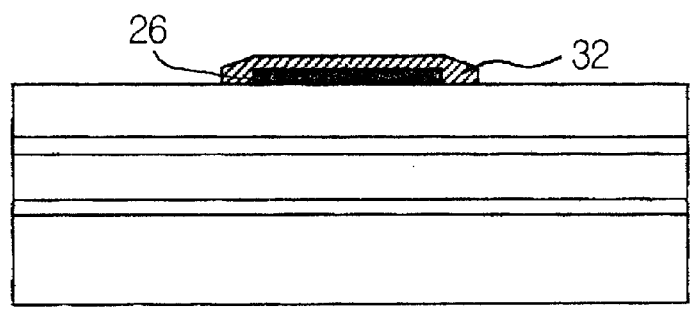

Referring to FIG. 3C, another dielectric film 32 of a stripe pattern of which width is W2(where W2≧W1) is formed.

Figure 3D:
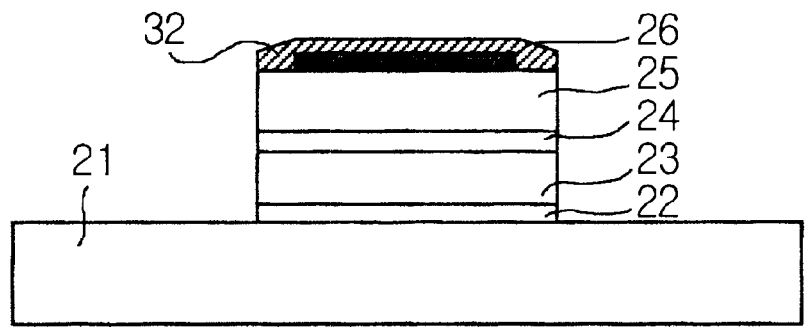

Referring to FIG. 3D, the above layers are etched vertically by dry etch in use of the dielectric film 32 as an etch mask until a surface of the substrate 21 is exposed.

Figure 3E:
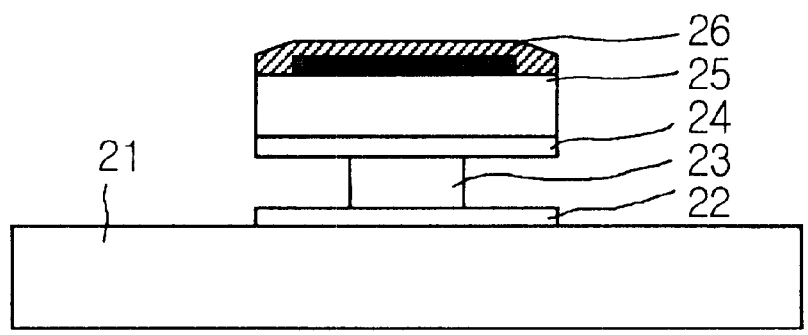

Referring to FIG. 3E, side of the light absorbing layer 23 is etched selectively by a $H_2SO_4$—$H_2O_2$ solution or $H_3PO_4$—$H_2O_2$ solution. Thus, the width of the light-absorbing layer 23 becomes W3(where W3<W1), while other widths of the light-wave guiding layers 22 and 24 and the p-type clad layer 25 become W2.

Figure 3F:
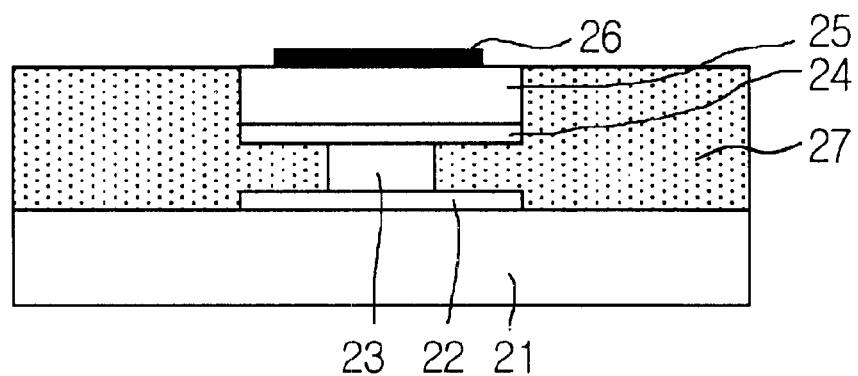

Referring to FIG. 3F, After a dielectric such as polyimide 27 has been formed at the sides of a ridge, the dielectric film 32 is removed to expose the p-type ohmic contact layer 26.

Figure 3G:
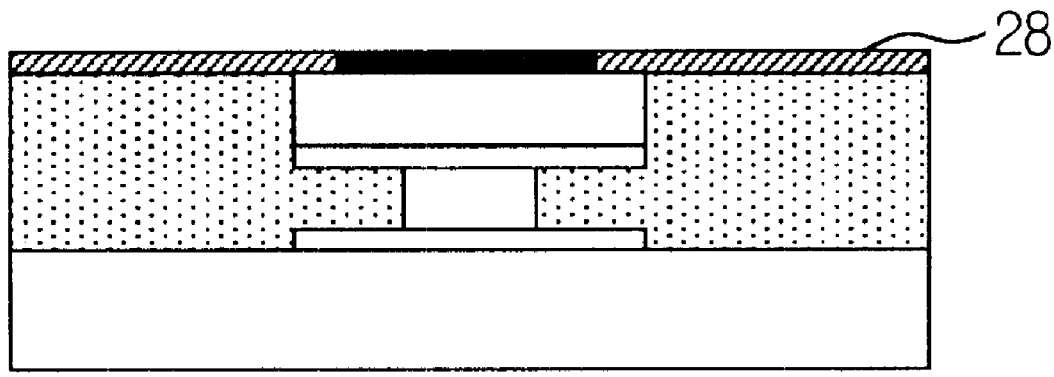

Referring to FIG. 3G, another dielectric film is formed to protect the rest parts except the p-type ohmic contact layer 26.

Figure 3H:
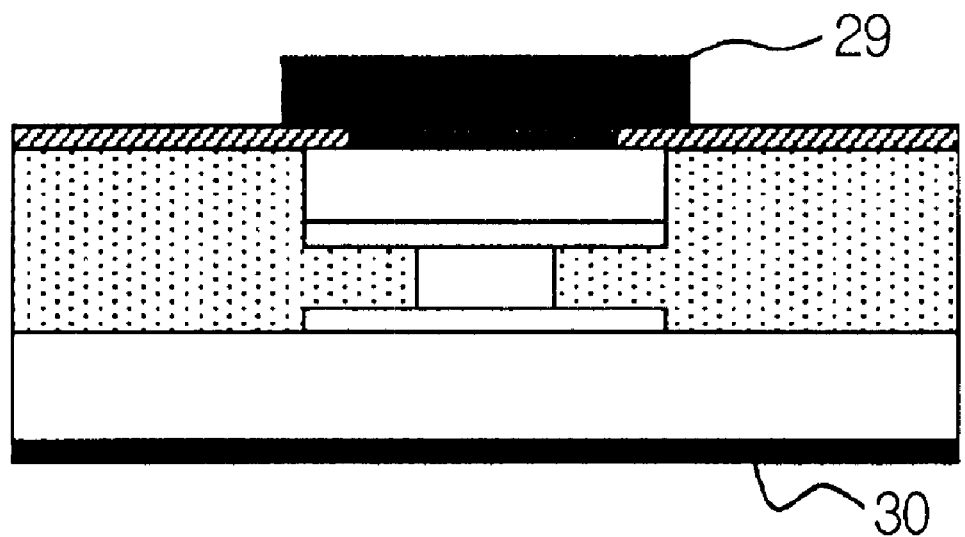

Referring to FIG. 3H, a p-type electrode 29 and an n-type electrode 30 are formed on the p-type ohmic contact layer 26 and beneath the substrate 21, respectively.

In the above-described structure, the selective side-etch is carried out to remove laterally the side amounting to (W2–W3)/2. "W1≦W2" is to prevent the p-type ohmic contact layer from being etched during the selective side-etch.

Besides, the following technique may be introduced to carry out the selective side-etch with ease in the above-described structure. Assume that W3=2 μm and W2=7 μm. Once the selective side-etch is carried out after the formation of a test pattern of which width is W2=5 μm on a wafer, W3 becomes exactly 2 μm by stopping the etch as soon as the test pattern is separated(which means that W2 is 0).

Therefore, the selective side-etch enables to form the width of the p-type ohmic contact layer wider than that of the light absorbing layer, thereby reducing contact resistance and capacitance simultaneously to realize high speed operation.

Accordingly, the present invention enables to provide high speed optical modulation of tens of giga rate of which modulating characteristics are excellent by reducing contact resistance and capacitance, which are the major problems of ruining the characteristics of an optical modulator, simultaneously.

It will be apparent to those skilled in the art that various modifications and variations can be made in a high speed semiconductor optical modulator and a fabricating method thereof of the present invention without departing from the spirit or scope of the inventions. Thus, it is intended that the present invention cover the modifications and variations of this invention provided they come within the scope of the appended claims and equivalents.

What we claim:

1. A high speed semiconductor optical modulator, the optical modulator formed by stacking an n-type light-wave guiding layer, a light absorbing layer, a p-type light-wave guiding layer, a p-type clad layer, and a p-type ohmic contact layer on a substrate successively, the optical modulator having a ridge structure wherein the optical modulator is an electric-field absorbing type, and wherein width of the light absorbing layer is less than that of the p-type ohmic contact layer.

2. The high speed semiconductor optical modulator according to claim 1, wherein width of the n-type light-wave guiding layer, p-type light-wave guiding layer, and p-type clad layer are identical with one another and wherein the width of the n-type light-wave guiding layer, p-type light-wave guiding layer, and p-type clad layer is greater than or equal to the width of the p-type ohmic contact layer.

3. The high speed semiconductor optical modulator according to claim 1, wherein the width of the light absorbing layer is 1~3 $\mu$m.

4. The high speed semiconductor optical modulator according to claim 1, wherein the width of the p-type ohmic layer is 5~10 $\mu$m.

5. A method of fabricating a high speed semiconductor optical modulator, comprising the steps of:

a first step of forming a ridge structure by stacking an n-type light-wave guiding layer, a light absorbing layer, a p-type light-wave guiding layer, a p-type clad layer, and a p-type ohmic layer on a substrate successively;

a second step of etching the p-type ohmic contact layer to have a width W1;

a third step of etching vertically the n-type light-wave guiding layer, the light absorbing layer, the p-type light-wave guiding layer, the p-type clad layer, and the p-type ohmic layer to have width W2; and a fourth step of side-etching the light absorbing layer to have a width W3 which is narrower than the width W1.

6. The method of fabricating a high speed semiconductor optical modulator according to claim 5, further comprising the steps of:

a fifth step of forming a dielectric at a side of the ridge structure;

a sixth step of forming a dielectric film on the p-type clad layer while the p-type ohmic contact layer is exposed; and a seventh step of forming a p-type electrode on the p-type ohmic contact layer and an n-type electrode beneath the substrate.

7. The method of fabricating a high speed semiconductor optical modulator according to claim 5, wherein the fourth step is carried out during a predetermined time enough to etch completely a test pattern of which width is equal to a difference between the widths W2 and W3.

8. The method of fabricating a high speed semiconductor optical modulator according to claim 5, wherein the width W2 is equal to or wider than the width of W1 of the p-type ohmic contact layer.

9. The method of fabricating a high speed semiconductor optical modulator according to claim 5, wherein the width W3 of the light absorbing layer is 1~3 $\mu$m.

10. The method of fabricating a high speed semiconductor optical modulator according to claim 5, wherein the width W1 of the p-type ohmic contact layer is 5~10 $\mu$m.

* * * * *